United States Patent
Hanko et al.

(10) Patent No.: US 11,436,113 B2
(45) Date of Patent: Sep. 6, 2022

(54) METHOD AND SYSTEM FOR MAINTAINING STORAGE DEVICE FAILURE TOLERANCE IN A COMPOSABLE INFRASTRUCTURE

(71) Applicant: Twitter, Inc., San Francisco, CA (US)

(72) Inventors: James G. Hanko, Redwood City, CA (US); Christopher Unkel, Palo Alto, CA (US); Jean-Francois Remy, Santa Clara, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/021,189

(22) Filed: Jun. 28, 2018

(65) Prior Publication Data

US 2020/0004650 A1 Jan. 2, 2020

(51) Int. Cl.
G06F 11/20 (2006.01)
G06F 3/06 (2006.01)
G06F 11/10 (2006.01)

(52) U.S. Cl.
CPC ........ *G06F 11/2094* (2013.01); *G06F 3/0619* (2013.01); *G06F 3/0631* (2013.01);
(Continued)

(58) Field of Classification Search
CPC .... G06F 3/067; G06F 3/0689; G06F 11/1076; G06F 11/2094; G06F 3/064;
(Continued)

(56) References Cited

U.S. PATENT DOCUMENTS

| 6,438,141 B1 | 8/2002 | Hanko et al. |
| 6,868,062 B1 | 3/2005 | Yadav et al. |

(Continued)

FOREIGN PATENT DOCUMENTS

| JP | 2007328611 A | 12/2007 |
| JP | 2008083939 A | 4/2008 |

OTHER PUBLICATIONS

Kubernetes documentation—Volumes, May 2018, Kubernetes.io (Year: 2018).*

(Continued)

*Primary Examiner* — Bryce P Bonzo
*Assistant Examiner* — Michael Xu
(74) *Attorney, Agent, or Firm* — Smith Baluch LLP

(57) ABSTRACT

Systems (e.g. data centers) having composable infrastructure, in which computing devices (e.g., servers) access disk drives organized into storage groups over a network or other communications mechanism, devices for implementing such systems, methods for configuring and operating such systems, and a computer readable medium which stores (in non-transitory fashion) code for performing any embodiment of the inventive method or steps thereof. Typically, the storage groups are determined such that the drives in each storage group have at least one coupled failure mechanism, and the drives are allocated to servers (and typically also, data items are placed in the servers) in accordance with storage group membership of the drives. In some embodiments, data from a server is stored in redundant fashion on at least two of the drives, e.g., in accordance a RAID technique.

47 Claims, 1 Drawing Sheet

(52) U.S. Cl.
CPC ........ *G06F 3/0689* (2013.01); *G06F 11/1076* (2013.01); *G06F 3/065* (2013.01); *G06F 3/067* (2013.01)

(58) Field of Classification Search
CPC .... G06F 3/0644; G06F 3/0619; G06F 3/0631; G06F 3/065; G06F 3/0665; H04L 67/1097; H04L 67/10
See application file for complete search history.

(56) References Cited

U.S. PATENT DOCUMENTS

| | | | |
|---|---|---|---|
| 9,417,997 B1* | 8/2016 | DeSimone | G06F 3/0631 |
| 9,794,112 B2 | 10/2017 | Hanko et al. | H04L 41/046 |
| 9,998,322 B2 | 6/2018 | Hanko et al. | H04L 41/046 |
| 10,291,707 B1* | 5/2019 | Lin | H04L 67/1097 |
| 10,534,629 B1* | 1/2020 | St. Pierre | G06F 9/5055 |
| 2001/0037371 A1 | 11/2001 | Ohran | |
| 2002/0166079 A1* | 11/2002 | Ulrich | G06F 11/1471 714/6.12 |
| 2003/0179707 A1 | 9/2003 | Bare | |
| 2003/0200477 A1 | 10/2003 | Ayres | |
| 2005/0050187 A1 | 3/2005 | Freimuth et al. | |
| 2005/0216552 A1* | 9/2005 | Fineberg | G06F 12/0284 709/203 |
| 2005/0259632 A1 | 11/2005 | Malpani et al. | |
| 2007/0002738 A1 | 1/2007 | Mcgee et al. | |
| 2007/0156879 A1 | 7/2007 | Klein et al. | |
| 2010/0017545 A1 | 1/2010 | Gildfind et al. | |
| 2010/0153964 A1 | 6/2010 | Thai et al. | |
| 2010/0247094 A1 | 9/2010 | Young | |
| 2011/0280404 A1 | 11/2011 | Jennas et al. | |
| 2013/0311719 A1 | 11/2013 | Doedline, Jr. et al. | |
| 2014/0089735 A1 | 3/2014 | Barrett et al. | |
| 2014/0223027 A1 | 8/2014 | Mullapudi et al. | |
| 2015/0029848 A1 | 1/2015 | Jain et al. | |
| 2015/0100826 A1* | 4/2015 | Vujic | G06F 9/5083 714/37 |
| 2015/0286419 A1 | 10/2015 | Guo et al. | |
| 2016/0011935 A1* | 1/2016 | Luby | G06F 3/0617 714/6.2 |
| 2016/0269229 A1* | 9/2016 | Franke | H04L 67/10 |
| 2016/0320986 A1 | 11/2016 | Bonwick | G06F 3/06 |
| 2016/0371020 A1 | 12/2016 | Sarkar et al. | G06F 3/06 |
| 2017/0199695 A1 | 7/2017 | Robins et al. | G06F 3/0631 |
| 2018/0081768 A1* | 3/2018 | Maheshwar | G06F 11/2094 |
| 2019/0068466 A1* | 2/2019 | Chagam Reddy | G06F 15/7867 |
| 2019/0095296 A1* | 3/2019 | McMurchie | G06F 11/2094 |
| 2019/0102269 A1* | 4/2019 | Abouelwafa | G06F 3/065 |
| 2019/0190778 A1* | 6/2019 | Easterling | G06F 9/45558 |
| 2019/0235775 A1* | 8/2019 | Zwiegincew | G06F 3/0604 |
| 2019/0243551 A1* | 8/2019 | Xu | G06F 11/3055 |
| 2019/0250852 A1* | 8/2019 | Kabra | G06F 3/0659 |
| 2019/0251279 A1* | 8/2019 | Emberson | G06F 21/6218 |
| 2019/0342418 A1* | 11/2019 | Eda | H04L 67/101 |
| 2019/0361626 A1* | 11/2019 | East | G06F 3/0629 |
| 2019/0370023 A1* | 12/2019 | Israni | G06F 9/5077 |
| 2019/0394088 A1* | 12/2019 | Narayanan | H04L 41/0816 |

OTHER PUBLICATIONS

Apache Hadoop. Wikipedia. Accessed at https://en.wikipedia.org/wiki/Apache_Hadoop#HDFS on Jun. 22, 2015. 11 pages.

Dell Storage SC4020 all-in-one array. Accessed at http://www.dell.com/us/business/p/dell-compellent-sc4020/pd on Jul. 8, 2015. 2 pages.

Dell Storage SC4020 review. ITPro. Accessed at http://www.itpro.co.uk/storage/23849/dell-storage-sc4020-review on Jul. 8, 2015. 7 pages.

MapReduce. Wikipedia. Accessed at https://en.wikipedia.org/wiki/MapReduce on Jun. 22, 2015. 13 pages.

SAS, FC, SCSI, and iSCSI Comparison Chart. AIC Inc. Jul. 31, 2007. Accessed at https://www.aicipc.com/image/images/download/SAS-FC-SCSI-iSCSI%20Comparison%20Chart_s_073107.pdf. 1 pages.

Serial Attached SCSI technologies and architectures. Technology brief, 4th edition. Hewlett-Packard Development Company TC0000772, Aug. 2011. 21 pages.

Extended European Search Report in European Patent Application No. 19825322.1 dated Feb. 16, 2022, 10 pages.

* cited by examiner

# METHOD AND SYSTEM FOR MAINTAINING STORAGE DEVICE FAILURE TOLERANCE IN A COMPOSABLE INFRASTRUCTURE

TECHNICAL FIELD

The invention pertains to methods and systems in which computing devices (servers) access disk drives (external to the servers) over a network or other communications mechanism, and to devices for implementing such methods and systems. In accordance with some embodiments, disk drives are organized into storage groups (e.g., such that the drives in each storage group have at least one coupled failure mechanism) and the drives are allocated to servers (and typically also, data items are placed in the servers) in accordance with storage group membership of the drives.

BACKGROUND

The following definitions apply throughout this specification, including in the claims: "storage device" denotes a device which is configured to store and retrieve data (e.g., a disk drive or flash memory). Typically storage devices are accessed using Logical Block Address (LBA) and a number of blocks. A logical block is a fixed sized chunk of the total storage capacity (e.g., 512 or 4096 bytes);

"disk drive" (or "drive") denotes a bulk data storage device. Examples of disk drives include (but are not limited to) drives containing spinning magnetic media or flash memory cells, or implementing at least one other data storage technology;

"JBOD" (or Just a Bunch Of Disks) denotes an enclosure containing a set of at least two disk drives. The enclosure typically has redundant power supplies and data communications connections;

"composable infrastructure" denotes a technique for designing a system (e.g., data center) including servers (each implementing at least one compute element) and disk drives, where the disk drives are external to the servers (and are attached or coupled to the servers using a data network or other communications mechanism), such that subsets of the disk drives are allocable (assignable) to individual ones of the servers, and each of the servers can use (e.g., store data on) at least one of the disk drives which is external thereto and has been allocated thereto. The communications mechanism is sometimes referred to herein as a "communications subsystem" (of a system having a composable infrastructure). Each of the servers may (but need not) also include (e.g., directly contain) at least one internal disk drive, but no such internal disk drive (if any is present) is one of the (external and allocable) disk drives mentioned in the previous sentence. For example, at least one of the servers may include an internal disk drive (sometimes referred to herein as a "boot" drive) which is used solely for booting its operating system. For another example, at least one of the servers may not include any internal disk drive. For another example, at least one of the servers may include an internal disk drive (e.g., a DAS disk drive) which the server uses for at least one operation other than booting the server's operating system, but which is not one of the external and allocable drives of the system. In this context, an internal disk drive (which is internal to a server) may be contained within the server's chassis, or it may be directly wired to a compute element (compute subsystem) of the server although it is not contained within the server's chassis. A system (e.g., data center) designed in accordance with the technique mentioned above (in this paragraph) is sometimes referred to herein as a composable infrastructure (or a composable architecture), or a system having a composable infrastructure (or composable architecture). The drives of a system having a composable infrastructure are typically (but not necessarily) accessed (by servers to which they are allocated) directly as "raw" storage devices, without the ability (except as provided by the servers themselves) to provide RAID, snapshot processing, de-duplication services, etc., which are traditionally available in NAS and SAN environments. In some embodiments, the drives of a system having a composable infrastructure are accessed by RAID controllers directly as "raw" storage devices, to store data from servers of the composable infrastructure on the drives;

"server" denotes a computing device (computer or processor) configured to run applications and typically also to access and use a storage device (e.g., disk drive) across a network (or other communications mechanism) to store and retrieve data (e.g., files and/or applications). A server typically includes at least one computing subsystem (sometimes referred to herein as a "compute element") which is programmed and/or otherwise configured to run applications;

"adapter" denotes a device configured to connect a storage device (e.g., a disk drive), or a storage system (e.g., a JBOD containing two or more disk drives) comprising two or more storage devices, to a communications subsystem (e.g., a network) of a system having composable infrastructure. Examples of adapters are described in U.S. Pat. No. 9,794,112, entitled "Method and System for Balancing Storage Data Traffic in Converged Networks;"

"server interface" denotes a component of a server that connects the server to a communications subsystem (e.g., a network) of a system having composable infrastructure, and "adapter interface" denotes a component of an adapter that connects the adapter to a communications subsystem (e.g., a network) of a system having composable infrastructure. Examples of a server interface (or an adapter interface) are a physical device (i.e., a Network Interface Controller (NIC)) and a software-defined wrapper of multiple NICs (as for link aggregation). In some embodiments of the invention, a server interface (or adapter interface) is a hardware or software element that has its own Internet Protocol (IP) address in a converged network;

"compute rack," in a composable architecture, denotes a rack of servers. Typically, each server does not contain any disk drive for bulk storage (but often, it contains a disk drive for booting its operating system);

"DAS" (or "Direct Attached Storage") for a server denotes one or more disk drives for bulk storage for a compute element (of the server), where each such disk drive (sometimes referred to as a "DAS drive") is directly wired to a compute element (compute subsystem) of the server. Typically, each DAS drive for a server is contained within the server's chassis. Examples of the wired connection techniques include (but are not limited to) SATA, SAS, and NVMe;

"data node" denotes a server (or a virtual machine implemented by, or other element of, a server) configured to perform storage operations for a scale-out application (e.g., Hadoop);

"scale-out application" denotes an application which a server is configured to run (typically, the server is programmed with software to execute the application) to coordinate the server's behavior with that of other servers (typically also configured to run the same application) attached or coupled to the server (using a data network or other communications mechanism), to allow the server to cooperate with at least one of the other servers to perform a processing operation (e.g., to solve a problem in distributed fashion). For example, to solve a problem in distributed fashion, all of the servers (each configured to run the same scale-out application) may run the scale-out application which coordinates their behavior;

"Hadoop" denotes a scale-out application provided by the Apache Foundation; "data placement policy" of an application (e.g., a scale-out application) denotes rules(s) in accordance with which a server running the application places data items (e.g., sends the data items to one or more other servers) and/or stores data items (e.g., on disk drives external to the server). "Data replication policy" denotes a data placement policy in accordance with whose rules(s) the server stores data items in redundant fashion on disk drives external to the server;

"NAS" (or "network attached storage") denotes a data storage architecture where an external file server provides (i.e., to the compute element of at least one other server) access to data in the form of files. NAS systems typically provide fault tolerance, de-duplication, and snapshot services, albeit at a much higher cost than DAS;

"RAID" (originally denoting "Redundant Array of Inexpensive Disks"), or a "RAID technique" or "RAID function," herein denotes a technique for combining (or an operation which combines) disk drives (e.g., unreliable disk drives) by storing data in redundant fashion on multiple disk drives to create a reliable storage mechanism. The disk drives on which a data item is stored data (in redundant fashion), by or in accordance with a RAID technique or RAID function, are referred to herein as a "RAID array" or "RAID set";

"SAN" (or "Storage Area Network") denotes a storage architecture where an external storage head provides (i.e., provides to the compute element of a server) block level access to storage. SAN systems typically provide fault tolerance, de-duplication, and snapshot services, albeit at a much higher cost than DAS;

"software defined storage" denotes an infrastructure where a software module or system is responsible for provisioning servers (e.g., providing the compute element of each of the servers) with storage;

"storage group" denotes a group of disk drives (e.g., a group organized together, by a programmed computing device, into a set) that can provide an allocation pool (e.g., a replacement pool), and which, when constructed to correspond to at least one common failure scenario, can be used to ensure that a server's (or an application's) access to data items can survive failures. Herein, an allocation pool (for a server) denotes a group of drives available for allocation to the server. An example of allocation is replacement, in the sense when a drive (previously allocated to a server) fails, allocation of another drive to the server (as a replacement for the failed drive) is an instance of allocation, sometimes referred to as "replacement," of a failed drive. Examples of a storage group include: all the drives in one or more JBODs, and all the drives in one or more storage racks;

"common failure" of disk drives (e.g., as in "common failure" risk, or mode of concern, or scenario, pertaining to the drives) denotes failure of all the drives together as a result of a common dependency of the drives. For example, disk drives installed in a single rack (where the rack is coupled to a network, and a set of power connections and network switches is attached to the rack) have a common dependency on the status of the rack, and are thus typically subject to a common failure risk that all the drives will fail (i.e., become inaccessible via the network) due to failure of the rack. The set of all drives subject to one common failure risk (or a single set of common failure risks) is sometimes referred to as a "common mode domain;" and "storage rack," in a composable architecture, denotes a rack of disk drives and/or JBODs including disk drives, and optionally also devices (e.g., adapters) for providing access to the drives (including the drives in each of the JBODS). An example of an adapter which may be included (e.g., with at least one disk drive and/or JBOD) in a storage rack is the DriveScale storage adapter.

Disk drives (either rotating magnetic media or flash memory) are commonly used for storage of bulk data on computers. Individual disk drives can fail, and thereby lose all the data stored on them. If important data is stored on only one disk drive, and it fails, there can be an enormous negative impact on the operations of a business. As a result, various techniques have been used to ensure that the failure of any one storage device does not disrupt the ability to recover the data.

Historically, disk drives for storing data for compute servers are either directly connected to servers (called Direct Attached Storage or "DAS"), or are connected over a network to a file server (Network Attached Storage or "NAS") or to a block storage head (Storage Area Networks or "SANs"). In the case of SAN storage, the block storage head may be connected to a data network and compute servers may also be connected to the data network, so that the disk drives (connected to a storage network, which is different than the data network) are connected via the block storage head to the data network. The techniques for each type of connection are similar, but the details vary based on the connection type.

For Direct Attached Storage (DAS) on a single system, the protection of data from data loss may be provided by either a hardware or software component implementing RAID (Redundant Arrays of Inexpensive Disks) software, to ensure the loss of one disk drive does not result in the loss of data. RAID techniques are similarly used in the so-called storage heads or file servers used to provide SAN and NAS storage, respectively. These techniques generally prevent the loss of data. However, in most cases, the failure of a single server or storage head can lead to a significant time to recover access to the data.

A new application architecture, called the scale-out architecture, was created to solve problems that are larger than any one computer can handle. In such an architecture, each computer of a number of computers (typically, a large number of less expensive computers, each including at least one DAS drive) executes a scale-out application, such that pieces of work are spread to the computers, and partial results are merged back together (e.g., to one computer) to form the desired answer (final result). The computers are servers, coupled together by a communications mechanism (e.g., data network), and each of the servers runs the scale-out application which coordinates their behavior to solve the problems. However, with many computers contributing to the solution, there would typically be many instances when at least one of them was broken or otherwise not operating correctly. While it could often be possible to recover data from the broken computer after a time, it might be impossible for the total answer of a problem to be computed while some of the data was unavailable. The original idea to deal with the data availability issue was that the application (which is installed on many of the servers and coordinates their behavior) would ensure that each item of data is provided to several such servers (sometimes called data nodes), with the assumption that each of the servers will store the item (e.g., on a DAS disk drive of the server), so that the failure of any of the servers (e.g., failure of a DAS disk drive of a server) will not lose any data or make it unavailable even for a brief period. With such redundant storage on DAS drives of multiple servers, it would be counter-productive to use any RAID technique on DAS drives within (or directly wired to) any individual server, because the loss of one server itself would remove access to the data that was duplicated within it (or on DAS drives directly wired to it), while still incurring the cost of the extra storage space for the data duplication.

Some scale-out applications have been implemented to take into consideration groups of devices that can fail together as a result of being installed on a single data center rack, with recognition that many servers and their disk drives can be installed into a data center rack, with a set of power connections and network switches attached to each rack. To avoid the possibility of losing access to data because of the failure of a rack's power or network connections, some scale-out applications (e.g., Hadoop) implement a data placement policy to place each piece (block) of data on servers in different racks, to ensure that each piece is stored on more than one rack. However, such methods do not recognize or address the issue of how to assign (to each server of a composable architecture) drives which are external to the server in a manner (e.g., an efficient manner) which takes into consideration common failure risks, and the data placement policy of such methods cannot take into consideration many common failure risks. For example, if there are multiple sets of devices of a composable architecture in a rack, and each of the sets shares a different common failure risk, the conventional methods cannot take into consideration such different common failure risks. For another example, even if the conventional methods place copies of a single piece of data onto servers in multiple racks, if all those servers store data on drives having a common failure risk (e.g., drives which are all in a single JBOD), occurrence of the common failure (e.g., failure of the single JBOD including all the drives) could make the data inaccessible.

Over time, traditional data center environments moved away from DAS to the other attachment types (e.g., NAS and SAN) because putting the compute element and storage element(s) into a single device (in accordance with DAS) made it hard to make adjustments when the relative demand for compute elements versus storage elements changed. The use of DAS storage on servers in scale-out applications allowed the overall cost of the data center to be lower and the data center to deliver higher performance than traditional data center architectures based on NAS and SAN, but it introduced the same inflexibility that originally caused DAS to be largely abandoned in the traditional data centers.

Modern data centers are beginning to use a new concept of a "composable infrastructure." In a composable infrastructure, the compute element in a server (data node) is connected to storage (at least one disk drive) over a communications mechanism. The communications mechanism may be a network (e.g., a standard data network) or it may it may implement another communications technology (e.g., PCIe, where "PCIe" denotes Peripheral Component Interconnect Express, a serial computer expansion bus standard).

Typically, many of the disk drives (of a composable infrastructure) are gathered into a box called a JBOD (Just a Bunch Of Disks) such that each drive can be accessed via the communications mechanism. The JBOD (or JBODs) may be installed in the same rack as the server(s), or the JBOD (or JBODs) and server(s) may be placed in separate racks. In some ways, this arrangement is similar to the traditional SAN, but to reduce cost and improve performance, each remote disk drive is offered as a raw drive, not as part of a storage array that could provide features such as RAID. Since, as discussed above, in scale-out application architectures (in which each server includes at least one DAS drive) it would be counter-productive to implement RAID on DAS drives within or directly wired to an individual server of a scale-out application architecture, the lack of RAID features in the data connection mechanism (of a composable infrastructure) provides a cost and performance benefit (relative to the scale-out application architectures) with no drawbacks.

Therefore, the use of a composable infrastructure for scale-out applications can provide the low cost and high performance of DAS while avoiding its inflexibility in adjusting to changing ratios of storage to compute devices. However, conventional implementations of composable infrastructures have not addressed the issue of how to prevent the loss of access to data in the case of a failure of any device while ensuring that pools of allocable storage resources are sufficiently large. For resource allocation to be effective, it is desirable to ensure the pools of resources to allocate are as large as possible. Otherwise a data center risks having a problem known as resource silos. That is, by dividing resources into silos and restricting which silo can be used, one can often reach a situation such that enough resources exist to perform a desired allocation, yet that the resources are in silos that cannot be used for the operation. But, if allocations of disk drives to servers are unconstrained, this can lead to situations where a failure of one device can cause loss of an item of data. For example, if allocations of disk drives to servers are unconstrained, and an application (e.g., Hadoop) places copies of a single piece of data onto servers in multiple racks, and the composable infrastructure has provided disk drives for all of those servers from a single JBOD, then the failure of the one JBOD box could make the data inaccessible (e.g., violating Hadoop's promise to keep the data always accessible). The inventors have recognized that in composable infrastructures for scale-out applications, severe or crude constraints on allocations of disk drives to servers are undesirable (e.g., since they can lead to the resource silo problem or to other inefficiencies), but some such constraints are needed to prevent loss of data due to device failure (e.g., failure of a single device).

Typical embodiments of the present invention provide methods and systems that ensure that the durability and availability requirements of scale-out applications can be met, while retaining the performance, cost, and flexibility benefits of software-defined storage provisioning in a composable infrastructure.

BRIEF DESCRIPTION OF THE INVENTION

An aspect of preferred embodiments of the invention is the organization of disk drives into collections called storage groups in accordance with at least one coupled failure mechanism (e.g., installation in the same JBOD and/or within the same rack) that pertains to the drives. Drive allocation and data placement decisions can then be guided by (e.g., made in accordance with) the membership of each relevant drive in one of the storage groups. For example, if a first subset of the drives is subject to a first coupled failure risk, and a second subset of the drives is subject to a second coupled failure risk, the drives may be organized into a first storage group (consisting of or including the first subset of the drives) and a second storage group (consisting of including the second subset of the drives), and the drives may be allocated to servers and a data placement policy implemented to ensure that a duplicate of each data item (to be stored by a server in a drive in the first storage group) is sent from the server to at least one other server (for storage by the other server in a drive in the second storage group), to assure that failure of any drive (or JBOD of drives) in the first subset cannot eliminate access to any data item. In one preferred embodiment, useful in a large data center with many storage racks, a storage group consists of all the drives and JBODs within one physical rack. In another preferred embodiment, useful in smaller data centers, JBODs in each storage rack are split into two or more storage groups. In other embodiments, each JBOD, or even each disk drive, is designated to be its own storage group. Storage groups of various sizes can be determined to achieve differing benefits.

In a class of embodiments, drives (organized in storage groups) are used with servers in a system (e.g., data center) which has a composable infrastructure. Each of the servers is configured (e.g., programmed) to execute at least one application (e.g., a scale-out application, which may be, for example, Hadoop or another rack-aware scale-out application). Drives are assigned (i.e., allocated) to at least one of the servers (e.g., in accordance with a scale-out application, or to determine a RAID set in accordance with an application implementing a RAID technique) in accordance with membership of each of the drives in the storage groups (e.g., for each of the servers, all drives allocated to the server belong to a single storage group per server). Typically also, at least two of the servers run a common application (e.g., scale-out applications run by the servers are identical or compatible applications) which allows each of the servers to access the drives which have been allocated thereto but not any of the drives which has not been allocated thereto, and a data placement policy of the common application is set in accordance with storage group membership of the drives assigned to the servers (e.g., to ensure that each block of data or other data item stored in accordance with the application is stored, in redundant fashion, in at least two distinct storage groups). For example, if the common application is a scale-out application, the data placement policy may require that a duplicate of a data item (to be stored by a first server) is sent from the first server to at least one other server (for storage by the other server), where the other server is chosen to ensure that the data item will be redundantly stored in at least two distinct storage groups (e.g., to assure that the failure of any drive, JBOD, or storage rack cannot eliminate access to any data item).

In some embodiments, drives (organized in storage groups) are used with servers (and optionally also at least one RAID controller external to each of the servers and each of the drives) in a system (e.g., data center) which has a composable infrastructure. The drives are external to, and assignable to, the servers. At least one of the servers (or at least one said RAID controller) is configured to run an application (e.g., an application which is not a scale-out application) which allows the server (or RAID controller) to implement a RAID technique to store data in a RAID set comprising drives of the system (e.g., to store the data itself, and/or place it on at least one other server which stores it). Typically, the server (or RAID controller interacting with the server) is allocated disk drives which belong to at least two storage groups, to ensure that each RAID set (e.g., RAID-1 or RAID-10 set) which stores redundant data from the server includes drives which belong to different storage groups. The storage groups may be determined and the drives allocated so that the drives of each RAID set include drives which do not have a common failure mechanism (e.g., the RAID set includes drives of different JBODs, and where possible, different storage racks). In some such embodiments, to implement the RAID technique, a subsystem of the server may function as a RAID controller, and an application running on the server may function as the RAID host. The server (or RAID controller external to the server), constructs a RAID set such that for each data item which is stored, drives of different storage groups store replicas of the data item (e.g., so that failure of any JBOD which stores the data item, and whose drives belong to single storage group, will not prevent access by the server to the data item). For example, in one such embodiment, n is the replication factor for each data item to be stored (e.g., n=2 or n=3), the drives of the RAID set are determined so that no more than 1/n of the drives belong to a single storage group. Thus, the n drives of the RAID set which are to hold replicas of the same data item belong to different storage groups.

Some embodiments of the invention are systems (e.g., data centers) having composable infrastructure. Other embodiments are devices (e.g., servers) useful for implementing such systems. In some embodiments, the system includes servers and disk drives coupled to a communications mechanism (e.g., a network), the drives have been organized into storage groups (typically, such that at least one of the storage groups consists of or includes those of the drives having at least one coupled failure mechanism), and none of the disk drives is directly contained in any of the servers. Typically, each of the servers is or includes a compute element configured (e.g., programmed) to run an application (e.g., a scale-out application). Each of the servers is allocated (e.g., by an application which it runs) a different subset of the drives in accordance with membership of each of the drives in the storage groups. Typically also, in operation of each of the servers (e.g., in accordance with an application which it runs), said each of the servers stores data in the drives assigned (i.e., allocated) thereto in accordance with a data placement policy (e.g., implemented by an application running on said each of the servers), where the data placement policy has been set in accordance with storage group membership of each of the drives assigned to said each of the servers (e.g., to ensure that each stored block, or other item, of data is stored in at least two distinct storage groups). The system may also include additional disk drives which are not included in any of the storage groups (e.g., at least one of the servers may directly contain a boot drive employed for booting its operating system, but such boot drive is not one of the disk drives which have been organized into storage groups).

In some embodiments, the system includes an administrator which runs an administration application implement a management process including by allocating drives to servers of the system in accordance with membership in storage groups, and typically also by implementing a data placement policy for the servers to which drives are allocated. The administrator is typically a server which is configured (e.g., programmed) to run the administration application and to interact with applications running on other servers and/or at least one RAID controller of the system (e.g., to allocate drives to the other servers and/or to configure the other servers to operate in accordance with a data placement policy, and/or to configure the RAID controller).

In some embodiments, a server (not an administrator) engages a composable infrastructure to initiate allocation of drives to at least one other server (e.g., with a particular use case in mind for each other server) in accordance with membership of the drives in storage groups. In these embodiments, the other server(s) may implement tasks assigned thereto by a first server, including by performing allocation (and subsequent release) of the drives (and placing data in accordance with a data placement policy for ensuring redundant storage of data in different storage groups), e.g., in response to a request from a software framework (e.g., an orchestration system for deploying tasks to a number of servers for execution, often for a short period of time) running on the first server. In some embodiments, the first server (not an administrator) requests storage of a data item by a RAID controller of a composable infrastructure, and the RAID controller operates (in response to the request) by implementing a RAID technique to store the data item in redundant fashion on drives in different storage groups.

In typical embodiments, various levels of failure tolerance and drive allocation (including drive replacement) flexibility can be achieved by adjusting storage group composition.

In some embodiments of the invention, if maximum resource allocation flexibility is a primary goal for a data center, subject to a constraint that any single item failure (up to the rack level) will not make any data item inaccessible, all the storage racks in the data center are divided into two storage groups, with approximately the same number of drives and storage capacity between them. By allocating all drives for each server of the data center from only one storage group, and setting the data replication (placement) policy (e.g., adjusting an adjustable data replication policy of a scale-out application being executed by the servers) to ensure each data item is replicated on at least two servers (in at least two compute racks) using at least two different storage groups (so that the data item resides in at least two storage groups), the goal of maximum resource allocation flexibility may be reached. If any drive fails, its replacement can be chosen from essentially half of the drives in the data center without causing any loss of failure tolerance (i.e., the replacement can come from any JBOD in the storage group, which encompasses half of the data center).

In some embodiments of the invention, if failure tolerance is a primary goal, in the sense that failure of any single item (up to the rack level) should not reduce the accessibility of any data item by more than one copy, all the storage racks in a data center can be divided into three approximately equal sized storage groups, and each data item can be placed in at least three storage groups. By allocating drives for each server all from (any) one storage group and requiring data copies on servers in at least three compute racks, the failure of any two drives, servers, JBODs, or racks cannot remove access to any data item. If a drive needs replacement, approximately one third of the drives in the data center would be eligible to replace it without compromising the fault tolerance in data access.

In some embodiments, all the drives allocated to a server are in the same storage group. This ensures that each data item stored by the server will be in the storage group, regardless of the drive chosen by the server to keep the data. A data placement policy of a scale-out application (running on the server) is preferably also set to ensure that all items of data are sent (placed) by one server to at least one other server such that each item is stored in at least two distinct storage groups.

In some embodiments in which a scale-out application can control data placement (of a data item by a server) to the disk drive level, drives allocated to (and used by) the server may belong to multiple storage groups. If drives in different storage groups are allocated to a server, a data placement policy of a scale-out application (running on the server) is preferably set to ensure that copies of each individual data item are spread among the storage groups (i.e., each item is stored in each of at least two storage groups) to ensure that no single failure can prevent access to any item.

In some embodiments, one or more adapters are used to couple drives (either in a JBOD or connected by another means) to a network, and servers are also coupled to the network. The drives are organized into storage groups such that the connectivity of the adapters is compatible with the failure characteristics of the drives. Aspects of the invention include an adapter, a disk drive (or other storage device) integrated with such an adapter, a JBOD (or other storage device system) integrated with such an adapter, and a server (programmed and/or otherwise configured to implement an embodiment of the inventive method).

In some embodiments, the invention is a method for configuring a system having composable infrastructure so that disk drives of the system are organized into storage groups (typically such that the drives in each storage group have at least one coupled failure mechanism), including by allocating the drives to servers of the system (and typically also, setting a data placement policy of the system so that data items are placed in the servers) in accordance with storage group membership of the drives. Other embodiments are methods for storing data on drives (including RAID methods for storing data in RAID arrays including drives) of such a system, methods for placing data items on servers of such a system for storage in drives of the system, and methods for configuring or controlling devices (e.g., servers or RAID controllers) of such a system. Other embodiments include systems configured to perform any such method, and devices configured to implement such a method or for use in such a system. Aspects of the invention are methods performed in operation of any embodiment of the inventive system, adapter, disk drive, JBOD, server, or other device.

The invention provides a method and system for ensuring that the durability and availability (i.e., failure tolerance) requirements of scale-out applications (and applications implementing RAID techniques) can be met, while retaining the performance, cost, and flexibility benefits of software-defined storage provisioning in a composable infrastructure. The technical problems solved in accordance with typical embodiments of the invention include how to implement:

a flexible (with adjustable disk drive storage to compute device ratio for each compute device) scale-out architecture with failure tolerance, greater efficiency and thus reduced cost (i.e., by reducing or eliminating "resource silo" cases in which available storage is not allocated to any of the compute devices (servers) due to inefficient restrictions on how it can be allocated), and high performance (by ensuring that there is sufficient storage for each compute device to operate with high performance). The durability and availability (i.e., failure tolerance) requirements of scale-out applications (and applications implementing RAID techniques) can be met with reduced cost by implementing them (using storage groups in accordance with embodiments of the invention) in a composable infrastructure, thus retaining the performance and flexibility benefits of software-defined storage provisioning in a composable infrastructure; and a composable infrastructure with failure tolerance, as well as greater efficiency and thus reduced cost (i.e., by reducing or eliminating "resource silo" cases in which available storage is not allocated to servers due to inefficient restrictions on how it can be allocated). The failure tolerance and increased efficiency and reduced cost benefits are attained by implementing the composable infrastructure using storage groups (in accordance with embodiments of the invention), thus retaining the flexibility (adjustable storage to compute device ratio) and high performance benefits of software-defined storage provisioning in a composable infrastructure.

DETAILED DESCRIPTION OF EMBODIMENTS OF THE INVENTION

Examples of embodiments of the inventive system having composable infrastructure (and methods performed during configuration and operation thereof in accordance with embodiments of the invention) will be described with reference to FIG. 1.

Figure 1:
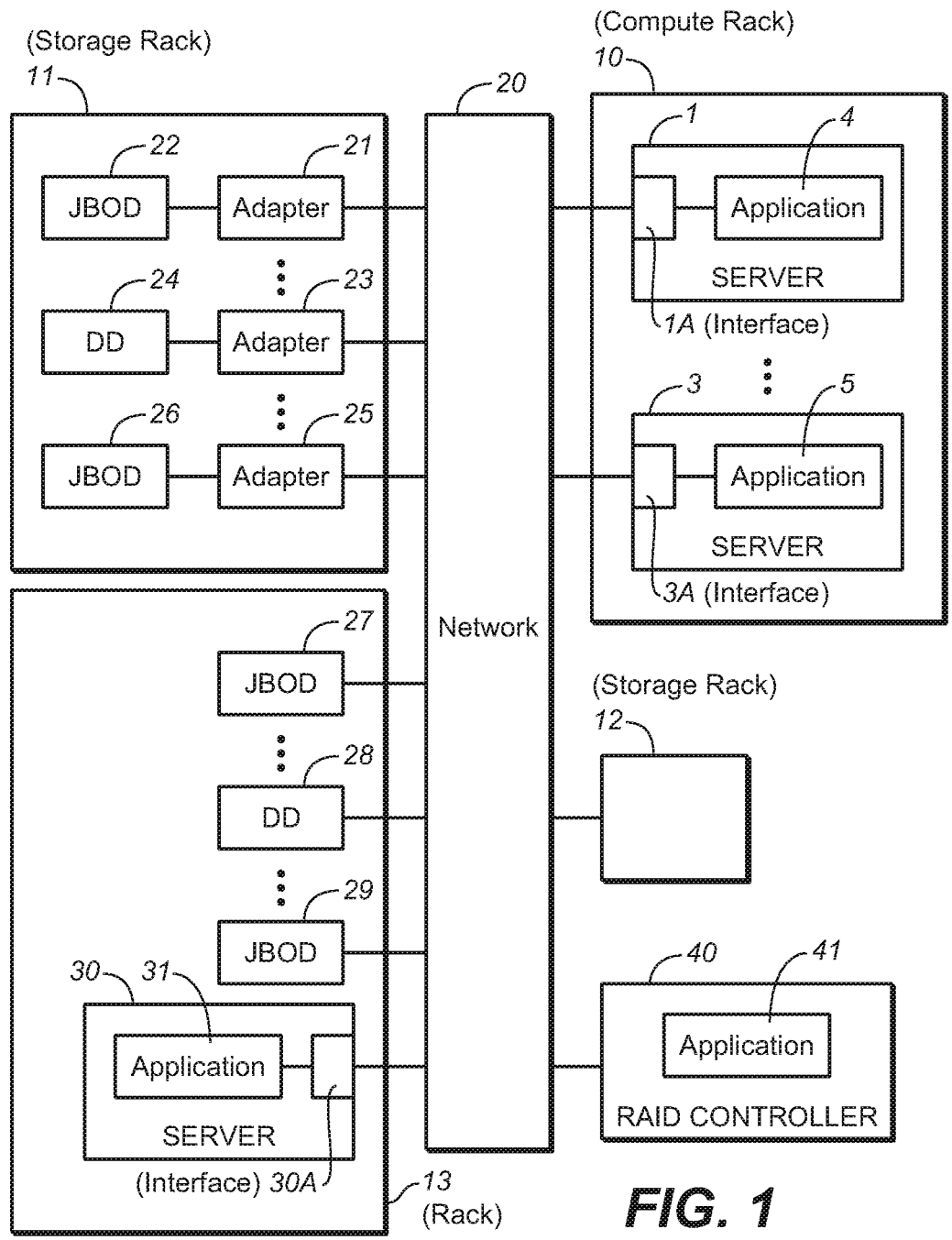
FIG. 1 is a block diagram of an embodiment of the inventive system having composable infrastructure.

The FIG. 1 system (which is a data center) has a composable infrastructure. In the FIG. 1 system, each of servers 1, 3, and 30 (and optionally also other servers), adapters 21, 23, and 25 (and optionally also other adapters), disk drive 28, and JBODs 27 and 29 (and optionally also other disk drives and/or JBODs, e.g., included in storage rack 12) are coupled to network 20. JBOD 22 is coupled by adapter 21 to network 20, disk drive 24 is coupled by adapter 23 to network 20, and JBOD 26 is coupled by adapter 25 to network 20. Each JBOD includes multiple disk drives. Some implementations of the system also include RAID controller 40 coupled to network 20.

Each of elements 1, 3, 30, and 40 is a server programmed to run application software. More specifically, server 1 is configured to include (e.g., is programmed with software implementing) application subsystem 4, and thus is sometimes described as being configured to run application 4. Server 3 is configured to include (e.g., is programmed with software implementing) application subsystem 5, and thus is sometimes described as being configured to run application 5. Server 30 is configured to include (e.g., is programmed with software implementing) application subsystem 31, and thus is sometimes described as being configured to run application 31. RAID controller 40 is a server configured to include (e.g., is programmed with software implementing) application subsystem 41, and is sometimes described as being configured to run application 41. Each server includes a server interface (e.g., server interface 1A of server 1, server interface 3A of server 3, and server interface 30A of server 30) which is configured to connect the server to network 20. Each server may also include a disk drive (e.g., a drive used only for booting) which is not assignable (or allocable) in accordance with any embodiment of the invention to any other server of the FIG. 1 system.

Each adapter (e.g., adapter 21, 23, and 25) includes an adapter interface (e.g., the adapter is programmed with software implementing, or is otherwise configured to implement, an adapter interface subsystem) which is configured to connect the adapter to network 20. In some embodiments, at least one (e.g., each) adapter interface and/or at least one (e.g., each) server interface of the FIG. 1 system may be implemented as a physical device (i.e., a Network Interface Controller ("NIC"), or a software-defined wrapper of multiple NICs, and/or is a hardware or software element that has its own Internet Protocol (IP) address.

Typically, at least one of the servers of the FIG. 1 system (e.g., any of elements 1, 3, 30, and 40, or another server (not shown in FIG. 1) coupled to network 20) is implemented as an administrator (described below) which has an application subsystem is different than that of the other servers of the system which are not administrators.

Servers 1 and 3 (and optionally also other servers) are mounted in rack 10 (which is a "compute rack" since it includes only servers). Elements 21, 22, 23, 24, 25, and 26 are mounted in rack 11 (which is a "storage rack" since it includes disk drives and adapters for providing network access to the drives, but not any server or RAID controller). Storage devices 27, 28, and 29 and server 30 (and optionally also other storage devices and/or servers) are mounted in rack 13.

Network 20 is a network (of a type sometimes referred to as a "converged network") which carries both storage data traffic and other (non-storage data) traffic. In one embodiment, network 20 is an Ethernet based network on which all traffic is sent between servers (e.g., servers 1, 3, and 30, and controller 40) coupled to the network and the storage devices coupled to the network. The elements of such an Ethernet based network (e.g., servers 1, 3, and 30, controller 40, and adapters 21, 23, and 25) may be configured to communicate over the network in accordance with the iSCSI (Internet Small Computer System Interface) networking protocol. In some embodiments, network 20 couples the servers and storage devices of the system by another type of connection, e.g., an RoCE, Fibre Channel, Infiniband, PCIe, or some other connection type. Alternatively, network 20 is replaced by another communications mechanism (e.g., the above-mentioned PCIe technology) which couples together the servers and storage devices of the system. Some of the storage devices are coupled via adapters (e.g., adapters 21, 23, and 25) to element 20, and some of the storage devices (e.g., JBOD 27, disk drive 28, and JBOD 29) are coupled to element 20 without use of adapters or separately implemented adapters.

The disk drives of the composable infrastructure (e.g., drives 22, 24, 25, 27, 28, 29, and the drives in rack 12) are organized in storage groups, and are assignable to servers of the composable infrastructure (e.g., servers 1, 3, and 30) in accordance with membership of the drives in the storage groups. Each of the servers to which the drives are assignable (e.g., each of servers 1, 3, and 30) is programmed to execute a scale-out application (e.g., each of applications 4, 5, and 31 is a scale-out application), which may be, for example, Hadoop or another rack-aware scale-out application. In accordance with the scale-out application, each of the servers may store data on one of the drives assigned thereto (but not on any of the drives which is not assigned thereto). Where at least two of such servers run a common application (i.e., where the scale-out applications run by the servers are identical or compatible applications), a data placement policy of the common application may be set in accordance with storage group membership of the drives assigned to the servers (e.g., to ensure that each block of data or other data item stored in accordance with the application is stored, in redundant fashion, in at least two distinct storage groups). Thus, each server may place a data item (to be stored by the server) on at least one other one of the servers (in accordance with a data placement policy of the common application) for storage by said each other one of the servers on a drive assigned to said each other one of the servers (e.g., to ensure that the data item is stored in redundant fashion in at least two distinct storage groups).

Disk drives of the composable infrastructure (e.g., drives 22, 24, 25, 27, 28, 29, and the drives in rack 12) are assignable by RAID controller 40 (i.e., in accordance with application 41, which implements a RAID technique) to servers of the composable infrastructure (e.g., servers 1, 3, and 30) in accordance with membership of the drives in the storage groups, in the sense that RAID controller 40 is configured to run application 41 to determine a RAID set of the drives (in accordance with membership of the drives in the storage groups) and to store (or otherwise cause storage of) a data item from any of the servers on the drives of the RAID set.

For example, in one embodiment, each of servers 1, 3, and 30, all drives allocated to the server belong to a single storage group per server (i.e., the drives assigned to server 1 belong to a first storage group, the drives assigned to server 3 belong to a second storage group, and the drives assigned to server 30 belong to a third storage group). Servers 1, 3, and 30 run a common application (i.e., applications 4, 5, and 31 are identical or compatible scale-out applications), and a data placement policy of the common application is set in accordance with storage group membership of the drives assigned to the servers (to ensure that each block of data or other data item stored in accordance with the application is stored, in redundant fashion, in at least two distinct storage groups). Specifically, the data placement policy may require that server 1 send a duplicate of a data item (to be stored by server 1 on a drive assigned to server 1 which belongs to the first storage group) to each of servers 3 and 30 (so that the data item will be stored by server 3 on a drive assigned to server 3 which belongs to the second storage group, and will also be stored by server 30 on a drive assigned to server 30 which belongs to the third storage group). The storage groups may be determined to assure that the failure of any drive, JBOD, or storage rack of the system cannot eliminate access to any data item.

Typically, one of the servers of the composable infrastructure (e.g., server 1, 3, or 30) is configured (e.g., programmed) to operate as an administrator. In typical embodiments, the administrator is programmed to run an application (an administration application) which implements a management process including by allocating drives to servers of the system in accordance with membership in storage groups, and typically also by implementing a data placement policy for the servers to which drives are allocated (in accordance with which a common application runs on the other servers, e.g., to ensure redundant storage of each data item in different storage groups). The administration application running on the administrator may configure (or reconfigure) the data center including by allocating the drives to servers of the data center in accordance with membership in storage groups (and optionally also informing a RAID controller of the data center of the allocation and storage group information). The administrator is typically configured (e.g., programmed) to run the administration application and to interact with applications running on other servers and/or on at least one RAID controller of the system (e.g., to allocate drives to the other servers and/or to configure the other servers to operate in accordance with a data placement policy, and/or to configure the RAID controller). The administration application may itself determine the storage groups, when it has been configured to have knowledge of the drives available for allocation to servers and coupled failure risks pertaining to the drives, or it may be configured by a user to operate in accordance with user-specified storage groups. The administration application typically has a user interface which allows a human user to enter constraints on storage group determination. In some cases, the user interface may allow a user to specify what are the storage groups. In operation, the administrator interacts with an application running on each of the servers, e.g., to assign drives of the composable infrastructure to each server in accordance with storage group membership.

For example, applications 4, 5, and 31 (of FIG. 1) running on servers 1, 3, and 30, respectively, and applications running on other servers in rack 10, may implement functions similar to those implemented by the conventional Hadoop application, with application 4 (for example) being implemented as an administration application (implementing functions similar to those of the ResourceManager and NameNode of Hadoop). Unlike in the conventional Hadoop application, the administration application (4) would determine storage groups (in accordance with an embodiment of the invention) and interact with applications 5 and 31 (and those running on other servers in rack 10) to ensure that drives are allocated to servers 3 and 30 (and other servers in rack 10) in accordance with storage group membership, and that servers 3 and 30 (and other servers in rack 10) implement a data placement policy in accordance with storage group membership of the drives allocated thereto. The data placement policy may require that a data block (in one server) also be placed on two other servers, so that the three servers store the block in drives of at least two (e.g., three) different storage groups. The administrator (server 1) would keep track of which other servers of the system have received each block.

In some embodiments, administration software is factored into two or more separate, cooperating pieces (e.g., software subsystems) which may be included in (and configured to run on) a single device (e.g., server) or two or more separate devices (e.g., two or more servers). Thus, in some embodiments, the administrator of the inventive system may be implemented as two or more separate devices (each running a different subsystem of administration software).

The servers (of embodiments of the inventive system) other than the administrator may run applications compatible with the administration application. Or, the administrator (which is a server) and the other servers may all run the same application, but the application running on the administrator is configured (to operate as an administration application) to have privileges (e.g., ability and authority to allocate drives in accordance with storage group membership or to determine a data placement policy) that are not enabled in the application running on the other servers.

An administrator of an embodiment of the inventive system may interact with an application running on a server of the system to mandate that the server implement a RAID function. The server itself may perform the RAID function. Or, the server may use a RAID controller (e.g., RAID controller 40) of the composable infrastructure to perform the RAID function. Typically, the RAID controller (e.g., application subsystem 41 of RAID controller 40) has also been configured by the administrator. The server may use the RAID controller by sending data (to be stored) to the RAID controller such that, in response, the RAID controller constructs a RAID array (including by selecting drives of the composable infrastructure in accordance with storage group membership) and stores the data thereon.

In typical embodiments implementing RAID techniques, a server (e.g., any of servers 1, 3, and 30 of FIG. 1) implements a RAID function internally, to store data on external drives which it accesses via the composable infrastructure (typically, the drives are accessible by the server as raw drives via the composable infrastructure). This is in contrast to traditional systems (not having composable infrastructure) where RAID functions are performed at the location of the disk drive(s), either in the server (for Direct Attached Storage) or in a storage array controller (for NAS and SAN). In typical embodiments, an administrator may assert to a server (e.g., over network 20) an instruction for a RAID function to be performed on the server (and typically also the level of failure tolerance needed), and then the server implements the RAID function including by determining a RAID array (including by selecting drives of the composable infrastructure in accordance with storage group membership, e.g., to preclude single point failures).

RAID is often used with a traditional file system structure (much like folders on a PC hard drive) so that an application running on a compute device (e.g., a server) does not make further placement decisions other than to store data into its 'local' file systems, and a RAID controller function (software subsystem) of the compute device implements a RAID technique to store the data. An aspect of the invention is performance of a RAID controller function (typically in software, but alternatively with hardware acceleration or using a complete hardware implementation) in a server, or a RAID controller external to a server, using remote drives (organized in storage groups) of a composable infrastructure, to store data (from the server) redundantly (in accordance with membership of the drives in the storage groups) on the remote drives. The drives are available and assignable because of the composable infrastructure.

In some embodiments, data from a server (e.g. any of servers 1, 3, or 30 of FIG. 1) is stored redundantly (using storage group information) on remote drives using a RAID technique, with the RAID controller functions implemented by a device (e.g., RAID controller 40 of FIG. 1) external to the server, where the RAID controller, drives, and server are coupled via the communication mechanism (e.g., network 20 of FIG. 1) of a composable infrastructure. Traditional external RAID controllers have a pre-assigned set of drives with known failure relationships. In contrast, in accordance with the embodiments described in this paragraph, the RAID controller identifies drives from a composable infrastructure (and combines them to construct a RAID array) using storage group information, to implement redundant RAID storage of data (from the server) on the drives (e.g., to ensure failure independence). In these embodiments, the RAID controller is typically informed (e.g., by an administrator) of the drives' storage groups in order to construct the RAID array. For example, the RAID controller may be appropriately programmed (e.g., may include a server agent which is appropriately programmed) to use the provided storage group information to construct the RAID array.

In typical embodiments, an application subsystem of each server (e.g., application subsystem 4, 5, or 31, respectively, of server 1, 3, or 30), or each server of some of the servers, of a data center (having composable infrastructure) is configured to initiate accesses by the server to disk drives coupled to a communications mechanism (e.g., network 20) of the data center (e.g., disk drives which have been allocated to the server in accordance with an embodiment of the invention), and an application subsystem of at least one RAID controller (e.g., application subsystem 41 of RAID controller 40) of the data center is configured to access disk drives coupled to a communications mechanism (e.g., network 20) of the data center to store data from a server of the data center in redundant fashion on a RAID array of the drives (in accordance with storage group membership of the drives). In typical operation, an administrator of the system has informed the application subsystem of storage group membership of the drives of the system.

Typically the decision to engage a composable infrastructure to allocate drives to a server is made by an administrator (or another device external to the server) with a particular use case in mind for the server. For example, application subsystem 4 of server 1 may implement an administration application in accordance with which server 1 (operating as an administrator) allocates disk drives to other servers of the FIG. 1 system (and typically also determines and/or implements a data placement policy) in accordance with membership of the drives in storage groups. However, in some embodiments of the invention, a decision to allocate drives to one or more servers (and/or for one or more servers to implement a RAID technique using allocated drives) is implemented by a server itself, e.g., in response to a request by a software framework (e.g., Kubernetes, which is an orchestration system for deploying tasks to a number of servers for execution, often for a short period of time). In order to execute tasks assigned thereto (e.g., by Kubernetes or similar software), a server (e.g., any of servers 1, 3, and 30 of FIG. 1) may manage the assignment and releasing of disk drives to one or more servers (in accordance with storage group membership) consistent with the task assignments.

In conventional scale-out application software, servers are typically modeled as having DAS drives, so that the only common failure domain for the drive(s) in each individual server is the chassis of the containing server. The failure domain for each server (and each DAS drive contained therein) is sometimes managed according to the rack in which the server resides, such that a redundant copy of data in one rack is placed in a second rack. If used in servers in a composable infrastructure (with assignable disk drives outside the servers) such scale-out application software may introduce coupled failures not anticipated by the scale-out application's data placement policy. However, by assigning all drives for each such server in accordance with an embodiment of the invention (for example, by assigning drives from only a single storage group per server), the coupled failure domains can be constrained (in accordance with an embodiment of the invention) to be covered by the standard data placement of the applications.

For example, a data center having a composable infrastructure may include racks ("compute racks") full of compute servers and other racks ("storage racks") full of JBODs of disk drives. If all the servers in each compute rack are allocated drives only from a particular storage rack, then a conventional data placement policy (e.g., the conventional Hadoop data placement policy), which places data on servers such that the data is stored in at least two storage racks, would also ensure that at least one copy of data will reside outside the storage rack associated with a server. Therefore, the failure of any single drive, server, JBOD, compute rack, or storage rack cannot remove the access to the data. The use of storage groups in accordance with embodiments of the invention can simplify such operations, for example, grouping all the JBODs (and thereby drives) in each storage rack into a unique storage group per rack. Then allocation of drives to servers is simplified by only assigning (in accordance with an embodiment of the invention) drives from a particular storage rack (i.e., storage group) to all the servers in the compute rack. A benefit of this example of allocation in accordance with the invention is that the data placement mechanisms of the scale-out application (e.g., Hadoop) do not need to be changed. However, this example of allocation limits flexibility in assigning drives to servers. For example, if more or fewer drives are needed in each compute rack than are supplied by a storage rack, the remaining resources could be wasted.

Some scale-out applications (e.g., Hadoop), allow an installation to modify the data placement algorithm to restrict the placement of copies of data to avoid other failure coupling mechanisms that are not directly modeled by the scale-out application. Many such features have been introduced to deal with data node instances implemented within virtual machines, where several such data node instances can be hosted on a single physical compute server. Using these features, additional constraints can be put on data placement such that two copies of a single item of data cannot be placed onto members within a specified set of data nodes (e.g., two virtual machines on a physical server). These features can be combined (i.e., used in new ways, in accordance with embodiments of the invention) with storage groups to provide a means of preventing coupled failures in a scale-out application, while largely preserving the flexibility of server and drive allocation to avoid wasted resources.

For example, assume a large data center with many storage racks and compute racks. Further assume that storage groups are determined (in accordance with an embodiment of the invention) such that each storage group is an integral number of entire storage racks (i.e., the "i"th storage group consists of $N_i$ entire storage racks, where $N_i$ is an integer, and the index i ranges over the number of storage groups), such that there are many storage groups available. Then, by assigning all disk drives for a server from one storage group, and modifying the data placement policy of the scale-out application (in accordance with an embodiment of the invention) to ensure that all items of data are sent to servers such that each item is stored in at least two distinct storage groups, it can be assured that the failure of any drive, JBOD, or storage rack cannot eliminate access to any data item. Combined with the scale-out application's usual policy of ensuring that servers in at least two compute racks have a copy, then it is possible to ensure that the failure of any drive, server, JBOD, storage rack, or compute rack cannot eliminate access to any data item. Additionally, depending on the choice of the number (N) of storage racks in each storage group, the drives associated with (assigned or allocated to) a server may come from a desired number (e.g., a predetermined large number) of storage racks, so the problem of wasted resources is essentially eliminated.

It will be apparent to those of ordinary skill in the art in view of the description herein that combining storage and compute devices in individual racks (rather than preventing any one rack from including both a storage device and a compute device) does not change the applicability and value of the present invention. For example, assume a scale-out application is used on a small computation problem, and all the storage resources (including JBODs) and compute resources fit in one rack (e.g., rack 11 of FIG. 1). Although the present invention cannot provide protection against the failure of the one rack (since it contains all the resources), it still can be used to ensure accessibility to the data in the face of the failure of any single component in the rack (when there are enough resources, e.g., JBODs and servers, available) by dividing the set of JBODs into two or more storage groups. In this environment, all the drives for each server would be assigned from one storage group. Then, by configuring the scale-out application's data placement policy (in accordance with an embodiment of the invention) to ensure each item of data is replicated on at least two servers using at least two different storage groups, the administrator can ensure that the failure of no server, drive, or JBOD in the rack can eliminate access to any data item.

Since typical scale-out applications make data placement decisions based only on the server that has the data to be stored, we have described examples of the use of storage groups in which all the drives allocated to a server are in the same storage group. This ensures that each data item stored by the server will be in the storage group, regardless of the drive chosen by the server to keep the data. In such examples, the data placement policy of the scale-out application is preferably set to ensure that all items of data are sent by one server to at least one other server such that each item is stored in at least two distinct storage groups. However, if the scale-out application has a way of controlling data placement to the disk drive level, some embodiments of the invention allow drives used by a server to come from (i.e., belong to) multiple storage groups. In these embodiments, the data placement policy of the scale-out application is set (e.g., by an administrator) to ensure that copies of each individual data item are spread among the storage groups (i.e., each item is stored in each of at least two storage groups) to ensure that no single failure can prevent access to any item. Thus, in some embodiments, some of drives allocated to a server are in different storage groups.

In some preferred embodiments, one or more adapters (e.g., adapters 21, 23, and 25 of FIG. 1) are used to couple drives (either in a JBOD or connected by another means) to the communications mechanism (e.g., network) of a system having composable infrastructure (where servers are also coupled to the communications mechanism), and the drives are organized into storage groups such that the connectivity of the adapters is compatible with the failure characteristics of the drives. In this case, in order to maintain failure independence, the adapters may be connected so that each adapter serves drives from only one storage group (e.g., storage groups may be determined so that adapter 21 serves drives from one storage group, adapter 23 serves drives (including drive 24) from a second storage group, and adapter 25 serves drives from a third storage group). For example, each adapter may connect to one or more JBODs, but only to JBODS whose drives are in the same storage group. Even if there is only one such adapter connected to the JBOD or JBODs, the failure of the adapter (or any of the JBODs) cannot remove access to the data items stored there, assuming that each item of data is replicated on at least two servers using at least two different storage groups. However, it is preferred that multiple adapters (all serving one set of drives from only one storage group) be employed to access the set of drives (as described in above-referenced U.S. Pat. No. 9,794,112) to further reduce adapter failure consequences and to allow network traffic to be balanced between the adapters.

In some embodiments in which one or more adapters are used to couple at least one disk drive in at least one storage device (e.g., a JBOD) to the communications mechanism (e.g., network) of a system having composable infrastructure, at least one of the adapters is integrated with at least one such storage device. For example, a JBOD (e.g., JBOD 22 of FIG. 1) and at least one adapter (e.g., adapter 21 of FIG. 1 and optionally also another adapter configured to be coupled to network 20) may be implemented as a single device (the JBOD integrated with the adapter(s)) configured to be coupled to the communications mechanism. One of the key benefits of typical embodiments of the present invention is that they allow grouping of resources into larger pools for allocation (e.g., replacement) than in conventional systems. For example, assume that drives for a server are always allocated from a single JBOD, and that it is possible to implement a scale-out application to keep each data item in multiple JBODs to avoid losing data if any JBOD fails. However, without flexibility to define storage groups in accordance with typical embodiments of the invention, such an arrangement would typically lead to inefficiency in allocating resources and/or make it hard to replace a failed resource. For example, assume that each JBOD contains 100 disk drives, and that each server requires 13 drives. Then only 91 of the drives in the JBOD could be used (i.e., at most, seven 13-drive subsets could be allocated to seven servers) if all drives must come from the same JBOD. The remaining 9 drives would, essentially, be wasted. However, if (in accordance with an embodiment of the invention) a storage group consisting of 13 of the JBODs were determined, and drives for servers were allocated with a constraint that all drives for each server must come from a single storage group, then all 1300 of the drives in the storage group could be allocated to servers.

For another example, assume that drives for a server are always allocated from a single JBOD, that it is possible to arrange a scale-out application to keep each data item in multiple JBODs to avoid losing data if any JBOD fails, that each JBOD contains 100 disk drives, and that each server requires 10 drives. In this example, all the drives in a JBOD could be used (i.e., allocated to servers), but if one drive (assigned to a server) fails, there would be no drive in the JBOD that could be assigned to the server to replace it. However, if (in accordance with an embodiment of the invention) a storage group consisting of two or more of the JBODs were determined, and drives for servers were allocated with a constraint that all drives for each server must come from a single storage group, then, in the case that one drive (assigned to a server) in the storage group fails, another device in the storage group might be available for assignment to the server to replace the failed drive.

In some embodiments of the invention, if maximum resource allocation flexibility is the primary goal, subject to a constraint that any single item failure (up to the rack level) will not make any data item inaccessible, an administrator (e.g., one of servers 1, 3, and 30 of FIG. 1, configured to run an administration application) can divide all the storage racks in a data center (e.g., the FIG. 1 system) into two storage groups, with approximately the same number of drives and storage capacity between them. By allocating all drives for each server from only one storage group, and setting a data placement policy (e.g., configuring a configurable data placement policy) of a scale-out application being executed by the servers to ensure each data item is replicated on at least two servers (in at least two compute racks) using at least two different storage groups (so that the data item resides in at least two storage groups), the data center satisfies the goal. If any drive fails, its replacement can be chosen from essentially half of the drives in the data center without causing any loss of failure tolerance (i.e., the replacement can come from any JBOD in the storage group, which encompasses half of the data center).

Alternatively, in some embodiments of the invention, if the failure tolerance constraint is tightened so that failure of any single item of a data center (up to the rack level) will not reduce the accessibility of any data item by more than one copy, an administrator (e.g., one of servers 1, 3, and 30 of FIG. 1, configured to run an administration application) can divide all the storage racks in the data center (e.g., the FIG. 1 system) into three approximately equal sized storage groups, and require that each data item be placed in at least three storage groups. By allocating drives for each server all from (any) one storage group and requiring data copies on servers in at least three compute racks, the failure of any two drives, servers, JBODs, or racks cannot remove access to any data item. If a drive needs replacement, approximately one third of the drives in the data center would be eligible to replace it without compromising the failure tolerance in data access.

In some embodiments, drives are allocated to servers in accordance with a constraint based method (sometimes referred to herein as a constraint resolver), such that the allocation can be (and preferably is) automatically implemented (e.g., by an administrator running administration software), and preferably such the allocation ensures that no single rack or JBOD failure can prevent access to any data item. For example, some such drive allocation methods includes a step (typically implemented automatically by an administrator running administration software) of:

identifying servers which are spread across (i.e., mounted in) a sufficient number of racks that failure of any one of the racks would result in effective loss of no more than a predetermined number or fraction of the servers, and allocating drives to the servers. For example, this step may be implemented by identifying s servers which are spread across at least n racks (where s and n are integers, and typically n≥2), where no more than "floor(s/n)" of the servers are in a single one of the racks, and allocating drives to the servers, where "floor(x)" denotes the largest integer less than or equal to x.

For another example, some such drive allocation methods includes a step (typically implemented automatically by an administrator running administration software) of:

allocating drives (organized in storage groups) to servers, such that each of the servers is allocated drives from only one of the storage groups, and subject to a constraint that the drives that are allocated are spread across at least m of the storage groups, where m is an integer (e.g., a predetermined integer), and preferably also, such that when drives are allocated to s of the servers, where s is an integer, no more than floor(s/m) of the servers are allocated drives from any single storage group. Thus, preferably, when s servers have been allocated drives, the next server (the "s+1"th server) will not be allocated drives from any storage group if this would cause more than floor((s+1)/m) of the servers to be allocated drives from that storage group.

For another example, some such drive allocation methods includes steps (typically implemented automatically by an administrator running administration software) of:

identifying servers which are spread across a sufficient number of racks that failure of any one of the racks would result in effective loss of no more than a predetermined number or fraction of the servers, and allocating drives to the servers. For example, this step may be implemented by identifying s servers which are spread across at least n racks (typically n≥2), where no more than "floor(s/n)" of the servers are in a single one of the racks, and allocating drives to the servers, where "floor(x)" denotes the largest integer less than or equal to x; and allocating drives (organized in storage groups) to servers, such that each of the servers is allocated drives from only one of the storage groups, and subject to a constraint that the drives that are allocated are spread across at least m of the storage groups, where m is an integer, and preferably also, such that when drives are allocated to s of the servers, where s is an integer, no more than floor(s/m) of the servers are allocated drives from any single storage group.

In some embodiments, a storage group (or each of two or more storage groups) encapsulates multiple coupled failure domains. For example, if the storage group spans (i.e., includes the disk drives of) multiple racks, all the disks in the storage group do not have a single coupled failure mode. Instead, the group includes multiple, independent coupled failure domains of drives (which may correspond to more than one type or instance of coupled failure). Such embodiments can provide a bigger pool of allocable drives (than provided in conventional systems) from which to choose (when implementing drive allocation), while providing failure tolerance and keeping the management of the data center simple. Thus, in some embodiments, a storage group includes (or consists of) drives which all share one coupled failure mode (mechanism), and in other embodiments, a storage group includes drives which share a common coupled failure mode (mechanism) and at least one other drive which does not share said common coupled failure mode (mechanism).

It will be apparent to those of ordinary skill in the art in view of the description herein that various levels of failure tolerance and allocation and replacement flexibility can be achieved (when implementing embodiments of the invention) by adjusting the composition of the storage groups.

We next describe additional aspects of some embodiments of the invention which implement RAID techniques.

Among the conventional RAID techniques, there are two that designate entire drives as replicas of other drives to avoid loss of access to the data: RAID-1 (mirroring) and RAID-10 (mirroring and striping). If individual drives of a composable infrastructure are assigned to a server (in the sense that the drives, which are external to the server, comprise a RAID set for storing at least one data item of the server) without regard to common failures, then each of the drives (e.g., both drives) of a RAID set can come from a single JBOD. If the JBOD were to fail, then the server would lose access to the data, even if the server remained running. Storage groups are used in some embodiments of the invention to ensure that disk drives (of a composable infrastructure) for each part (e.g., half) of a RAID-1 or RAID-10 set come from different JBODs, and where possible, from different storage racks. In some such embodiments, if n is the replication factor for storage of data (from a server) in disk drives of a RAID set (where n is typically two, or sometimes three), storage groups (of the drives available for implementing the RAID set) are determined (preferably, such that the drives in each storage group have at least one coupled failure mechanism, e.g., the drives are included in one JBOD), and drives of the RAID set are determined such that no more than 1/n of the drives (allocated for the RAID set) belong to a single storage group. More specifically, drives which a RAID controller (which may be a software, firmware, and/or hardware subsystem of a server, or may be external to the server) includes in a RAID set are assigned by the controller (e.g., by the controller subsystem of a server) to the server (which has the data to be stored) in accordance with membership of each of the drives in the storage groups, such that no more than 1/n of the drives (of the RAID set) belong to a single storage group. Thus, in the described embodiment, the RAID set is constructed such that when data from the server is stored in the RAID set, the n (again, typically two) drives holding replicas of each single data item belong to different storage groups. This can ensure that the failure of any drive or JBOD in a single storage group does not prevent the server from having access to the data. If the storage group includes all the drives and JBODs within a storage rack (or two or more storage racks), then the failure of a drive or a JBOD within the rack (or failure of an entire storage rack of a storage group including at least two storage racks) will not prevent access to any of the data in the RAID set by the server.

We next describe in more detail operational aspects which pertain to some embodiments of the invention.

In some embodiments of the invention, JBODs (and thus, their contained disk drives) can be automatically assigned to storage groups when they are first installed in a data center. In one preferred embodiment, a user (e.g., by interacting with a user interface of an administration application running on an administrator of the data center) or administrator of the data center (by operation of an administration application running on the administrator) sets a default policy to determine how many storage groups should be created per rack (or per some other measure of closeness, such as, for example, disk subnet or common first network switch). In some such embodiments, the JBODs are assigned (to storage groups) in a manner that tries to balance the number and capacity of drives in each created storage group. In some embodiments, the data center architect can manually designate the storage groups for drives and/or JBODs.

In some embodiments of the inventive system, servers and drives can be allocated together by use of a constraint based selection mechanism in a software defined storage system (e.g., a constraint based selection mechanism implemented by an administration application running on an administrator of a composable infrastructure), by allocating to one or more servers (with a requested compute and memory capacity) drives that are connectable via the composable infrastructure such that all of the drives are of the desired capacity and type and that all are from a single storage group. Such a mechanism relieves the administrator from the task (which may be tedious) of identifying individual servers and drives that should be connected together. In addition, the constraint based selection mechanism (sometimes referred to herein as a constraint resolver) can include implicit considerations, such as the variations in connection speeds between the available servers and drives without the administrator explicitly requesting that such elements be considered.

Typical embodiments of the invention provide a simple mechanism for allowing scale-out applications to be used in composable data center infrastructures such that the data center can retain the low cost and high performance attributes of DAS storage, and the flexibility of the composable infrastructure, and also ensure that the failure of any single element in the data center cannot prevent access to the data.

Typical embodiments of the invention scale from very small systems, where all devices fit in a single rack, to full sized data centers with many racks of storage and compute devices, all with a single mechanism that can ensure reaching the level of failure tolerance available.

Typical embodiments of the invention allow an administrator to provide a desired level of failure/fault tolerance using a simple, high-level specification, while retaining the allocation flexibility benefits of a composable infrastructure. Once in place, typical embodiments of an administrator can easily assess and analyze the failure/fault tolerance state of an entire data structure. In addition, validating the failure tolerance of even a very complex set of interconnections in a large scale-out application deployed in a data center becomes almost trivial. By contrast, without the use of such embodiments, the freedom of resource allocation provided by composable infrastructures can lead to a combinatorial explosion of coupled failure opportunities in a large scale-out application deployment. For instance, replacing one drive with another (in a manner that is not in accordance with an embodiment of the invention) may introduce unexpected coupled failures that are hard to detect, especially if there are thousands of servers and tens of thousands of drives involved in the deployment.

Embodiments of the present invention, which are deployed in a composable infrastructure and which implement improved versions of traditional applications (e.g., for implementing RAID techniques) can provide better failure tolerance than the traditional applications (as well as other benefits). With a suitably designed RAID set (constructed in accordance with storage group membership), those which implement improved versions of traditional RAID applications (using RAID techniques) can ensure that the only common device between the two sides of the RAID set is the server itself. Thus, it can be trivial to validate that no failure of a single device (e.g., any disk drive, or JBOD or rack including any disk drive, of the RAID set) can prevent access to the data because all the devices for each data storage path (other than the server itself) are separate and distinct.

Typical embodiments of the invention can be implemented using, but do not require use of, JBODs, adapters, or any other specific piece of equipment. If there are no JBODS, individual drives can be placed into storage groups that correspond to any particular common failure mode of concern. For example, a storage group may represent a common power supply, or a common network connection.

In some embodiments, the inventive server (e.g., a server configured to be an administrator or a RAID controller) is or includes a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and a processing subsystem that is programmed (and/or otherwise configured) to perform an embodiment of the inventive method (or steps thereof) in response to data asserted thereto.

Other aspects of the invention are methods performed in operation of any embodiment of the inventive system, or a device (e.g., RAID controller, storage device, administrator, or server) thereof.

One such method is a method for storing data in a system having a composable infrastructure, wherein the system includes a communications subsystem, and disk drives and servers coupled to the communications subsystem, wherein the drives are organized into storage groups in accordance with at least one coupled failure mechanism that pertains to said drives, said method including steps of: and to each server of a set of at least some of the servers, allocating a different subset of the drives in accordance with storage group membership of the drives; and in accordance with an application running on one of the servers of the set, storing data on one or more of the drives which have been allocated to said one of the servers, but not on any of the drives which has not been allocated to said one of the servers.

Another such method is a method for storing data in a system having a composable infrastructure, wherein the system includes a communications subsystem, and disk drives and servers coupled to the communications subsystem, wherein the drives are organized into storage groups in accordance with at least one coupled failure mechanism that pertains to said drives, said method including:

in accordance with an application running on one of the servers, performing a RAID function including by determining a RAID set of the drives in accordance with storage group membership of each of the drives in the RAID set, and storing data in redundant fashion on the drives of the RAID set.

Another such method is a method for configuring a system having a composable infrastructure, wherein the system includes a communications subsystem, and disk drives and servers coupled to the communications subsystem, wherein the drives are organized into storage groups in accordance with at least one coupled failure mechanism that pertains to said drives, said method including:

a step of, in accordance with an administration application running on one of the servers, allocating to each server of a set of at least some of the servers, a different subset of the drives in accordance with storage group membership of the drives; and/or a step of configuring at least one of the servers to implement a RAID function, including by determining a RAID set of the drives in accordance with storage group membership of each of the drives in the RAID set.

Figure 2:
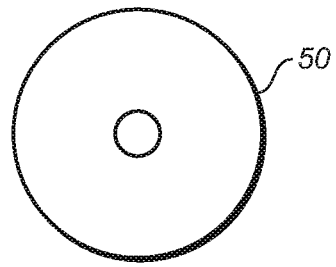
FIG. 2 is a tangible, computer readable medium which implements non-transitory storage of code for performing (e.g., code executable to perform) an embodiment of the inventive method or steps thereof.

Another aspect of the invention is a tangible, computer readable medium (for example, a disc or other tangible storage medium) for implementing non-transitory storage of data, and which stores (in non-transitory fashion) code for performing (e.g., code executable to perform) any embodiment of the inventive method or steps thereof. An example of such a tangible, computer readable medium is computer readable medium 50 of FIG. 2 (which may be a disc or other tangible storage medium), which stores (in non-transitory fashion) code for performing (e.g., code executable to perform) any embodiment of the inventive method or steps thereof.

It should be understood that while certain forms of the invention have been illustrated and described herein, the invention is not to be limited to the specific embodiments described and shown or the specific methods described. The claims that describe methods do not imply any specific order of steps unless explicitly described in the claim language.

What is claimed is:
1. A system, including:
a communications subsystem;
a set of racks, each rack of the set of racks representing a common failure risk for components installed in that rack; and
a set of components installed on the set of racks, including:
a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups; and
a set of servers communicably coupled to the communications subsystem and communicably coupleable to the set of storage drives via the communications subsystem, wherein a first server of the set of servers has allocated thereto a subset of first storage drives of the set of storage drives that are associated with a corresponding subset of first storage groups of the set of storage groups, such that the first server can access the subset of first storage drives but not any other storage drives of the set of storage drives, and wherein the set of servers further includes an administrator server communicably coupled to the com- munications subsystem and configured to, prior to placement of data on the set of storage drives by the set of servers:
determine, or receive an indication of, the set of storage groups; and
allocate the storage drives of the set of storage drives to the servers in the set of servers in accordance with membership of the each storage drive of the set of storage drives in the set of storage groups.

2. The system of claim 1, wherein the subset of first storage groups consists of storage drives having a single common failure risk of the set of common failure risk(s).

3. The system of claim 2, wherein the first server is configured to run an application such that each data item is stored in accordance with a data placement policy, wherein the data placement policy includes storing the data item in the subset of first storage groups and in a subset of second storage groups of the set of storage groups via a second server of the set of servers, wherein one of the subset of first storage groups and the subset of second storage groups includes storage drives having a common failure risk and the other of the subset of first storage groups and the subset of second storage groups does not include any of those storage drives having the same common failure risk.

4. The system of claim 3, wherein the application is a scale-out application.

5. The system of claim 1, wherein:
a plurality of storage drives of the subset of the first storage drives all share a common failure risk, and
at least one of the storage drives of the subset of first storage drives does not share that common failure risk.

6. The system of claim 1, wherein at least one of the servers is configured to determine a redundant array of inexpensive disks (RAID) set of the storage drives in accordance with storage group membership of each of the storage drives in the RAID set.

7. The system of claim 6, wherein the RAID set includes a storage drive from at least two storage groups of the set of storage groups, wherein one storage group of the at least two storage groups includes storage drives of the set of storage drives having a common failure risk, and the other storage group of the at least two storage groups does not include any of the storage drives having that common failure risk.

8. The system of claim 1, wherein the administrator server is configured to interact with each other server of the set of servers to place data, to be stored by said each other server, via at least one other server of the set of servers in accordance with a data placement policy set in accordance with storage group membership of each storage drive of the set of storage drives allocated to the servers of the set of servers, to store the data in at least two storage groups of the set of storage groups.

9. The system of claim 1, wherein the administrator server is configured to interact with at least one other server of the set of servers to mandate that the other server implement a RAID function by determining a RAID set of storage drives of the set of storage drives in accordance with storage group membership of each storage drive of the set of storage drives in the RAID set.

10. The system of claim 1, further comprising a RAID server communicably coupled to the communications subsystem and configured to determine a RAID set of storage drives of the set of storage drives in accordance with storage group membership of each storage drive of the set of storage drives in the RAID set.

11. The system of claim 10, wherein the RAID server is further configured to cause data to be stored in redundant fashion in the RAID set of storage drives, wherein the RAID set of storage drives includes a storage drive from at least two storage groups of the set of storage groups, wherein one storage group of the at least two storage groups includes storage drives of the set of storage drives having a common failure risk, and the other storage group of the at least two storage groups does not include any of the storage drives having that common failure risk.

12. The system of claim 1, wherein at least some storage drives of the set of storage drives are included in at least one just a bunch of disks (JBOD) configuration, wherein each of the at least one JBODs is coupled to the communications subsystem.

13. The system of claim 1, wherein the set of servers are distributed across the set of racks such that failure of a single rack of the set of racks would result in effective loss of no more than a predetermined number or fraction of the set of servers.

14. The system of claim 13, wherein the set of servers includes s servers which are distributed across at least n racks of the set of racks, where s and n are integers, where no more than floor(s/n) of the servers are in a single rack of the set of racks, and where floor(s/n) denotes the largest integer less than or equal to s/n.

15. The system of claim 13, wherein the set of servers includes s servers which are distributed across at least n racks of the set of racks, where s and n are integers, where no more than floor(s/n) of the servers are in a single rack of the set of racks, and where floor(s/n) denotes the largest integer less than or equal to s/n; and
wherein each server of the set of servers has been allocated storage drives from only one of the storage groups of the set of storage groups, and wherein the storage drives that are collectively allocated to the set of servers are spread across at least m storage groups of the set of storage groups, where m is an integer.

16. The system of claim 1, wherein each server of the set of servers has allocated thereto storage drives from only one storage group of the set of storage groups, wherein the storage drives that are collectively allocated to the set of servers are spread across at least m storage groups of the set of storage groups, where m is an integer.

17. The system of claim 16, wherein s servers of the set servers have storage drives from the set of storage drives allocated thereto, where s is an integer, such that no more than floor(s/m) of the servers are allocated storage drives from any single storage group, where floor(s/m) denotes the largest integer less than or equal to s/m.

18. A first server, configured for use in a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers including the first server, each server of the set of servers communicably coupled to the communications subsystem and communicably coupleable to the set of storage drives via the communications subsystem, the set of servers further including an administrator server communicably coupled to the communications subsystem and configured to, prior to placement of data on the set of storage drives by the set of servers: determine, or receive an indication of, the set of storage groups; and allocate the storage drives of the set of storage drives to the servers in the set of servers in accordance with membership of the each storage drive of the set of storage drives in the set of storage groups, the first server including:
 a server interface configured to communicably couple the first server to the communications subsystem; and
 at least one computing subsystem, coupled and configured to run at least one application, wherein the first server has allocated thereto a subset of first storage drives of the set of storage drives that are associated with a corresponding subset of first storage groups of the set of storage groups, such that the first server can access the subset of first storage drives but not any other storage drives of the set of storage drives.

19. The first server of claim 18, wherein at least one of the storage groups of the subset of first storage groups consists of storage drives having a single common failure risk of the set of common failure risk(s).

20. The first server of claim 19, wherein the at least one application is configured such that each data item is stored in accordance with a data placement policy, wherein the data placement policy includes storing the data item in the subset of first storage groups and in a subset of second storage groups of the set of storage groups via a second server of the set of servers, wherein one of the subset of first storage groups and the subset of second storage groups includes storage drives having a common failure risk and the other of the subset of first storage groups and the subset of second storage groups does not include any of those storage drives having the same common failure risk.

21. The first server of claim 20, wherein the application is a scaleout application.

22. The first server of claim 18, wherein:
 a plurality of storage drives of the subset of the first storage drives all share a common failure risk, and
at least one of the storage drives of the subset of first storage drives does not share that common failure risk.

23. The first server of claim 18, further configured to determine a redundant array of inexpensive disks (RAID) set of the storage drives in accordance with storage group membership of each of the storage drives in the RAID set.

24. The first server of claim 23, wherein the RAID set includes a storage drive from at least two storage groups of the set of storage groups, wherein one storage group of the at least two storage groups includes storage drives of the set of storage drives having a common failure risk, and the other storage group of the at least two storage groups does not include any of the storage drives having that common failure risk.

25. An administrator server, configured for use in a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers including the administrator server, each server of the set of servers communicably coupled to the communications subsystem and communicably coupleable to the set of storage drives via the communications subsystem, said administrator including:
 a server interface configured to communicably couple the administrator to the communications subsystem; and
 at least one computing subsystem, coupled and configured to run at least one administration application to, prior to placement of data on the set of storage drives by the set of servers:
  determine, or receive an indication of, the set of storage groups; and
  allocate the storage drives of the set of storage drives to the servers in the set of servers in accordance with membership of the each storage drive of the set of storage drives in the set of storage groups, such that a first server of the set of servers has allocated thereto a subset of first storage drives of the set of storage drives that are associated with a corresponding subset of first storage groups of the set of storage groups, such that the first server can access the subset of first storage drives but not any other storage drives of the set of storage drives.

26. The administrator server of claim 25, wherein at least one of the storage groups of the subset of first storage groups consists of storage drives having a single common failure risk of the set of common failure risk(s).

27. The administrator server of claim 26, wherein the administration application is configured:
 to set a data placement policy set in accordance with storage group membership of each storage drive of the set of storage drives, and
 when the administrator is coupled to the communication subsystem, to interact with each other server of the set of servers to place data, to be stored by said each other server, via at least one other server of the set of servers in accordance with a data placement policy set in accordance with storage group membership of each storage drive of the set of storage drives allocated to the servers of the set of servers, to store the data in at least two storage groups of the set of storage groups, wherein one of the subset of first storage groups and a subset of second storage groups of the set or storage groups includes storage drives having a common failure risk and the other of the subset of first storage groups and the subset of second storage groups does not include any of those storage drives having the same common failure risk.

28. The administrator server of claim 25, wherein the computing subsystem is configured to allocate the drives such that the set of servers are distributed across the set of racks such that failure of a single rack of the set of racks would result in effective loss of no more than a predetermined number or fraction of the set of servers.

29. The administrator server of claim 25, wherein the computing subsystem is configured to allocate the drives to s servers which are distributed across at least n racks of the set of racks, where s and n are integers, where no more than floor(s/n) of the servers are in a single rack of the set of racks, and where floor(s/n) denotes the largest integer less than or equal to s/n; and
 wherein each server of the set of servers has been allocated storage drives from only one of the storage groups of the set of storage groups, and wherein the storage drives that are collectively allocated to the set of servers are spread across at least m storage groups of the set of storage groups, where m is an integer.

30. The administrator server of claim 25, wherein the computing subsystem is configured to allocate the drives to s servers which are distributed across at least n racks of the set of racks, where s and n are integers, where no more than floor(s/n) of the servers are in a single rack of the set of racks, and where floor(s/n) denotes the largest integer less than or equal to s/n.

31. The administrator server of claim 25, wherein the computing subsystem is configured to allocate the drives such that each server of the set of servers has allocated thereto storage drives from only one storage group of the set of storage groups, wherein the storage drives that are collectively allocated to the set of servers are spread across at least m storage groups of the set of storage groups, where m is an integer.

32. The administrator server of claim 31, wherein the computing subsystem is configured to allocate the drives such that when s servers of the set servers have storage drives from the set of storage drives allocated thereto, where s is an integer, such that no more than floor(s/m) of the servers are allocated storage drives from any single storage group, where floor(s/m) denotes the largest integer less than or equal to s/m.

33. A RAID server, configured for use in a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers, each server of the set of servers communicably coupled to the communications subsystem and communicably coupleable to the set of storage drives via the communications subsystem, wherein a first server of the set of servers has allocated thereto a subset of first storage drives of the set of storage drives that are associated with a corresponding subset of first storage groups of the set of storage groups, such that the first server can access the subset of first storage drives but not any other storage drives of the set of storage drives, the set of servers further including an administrator server communicably coupled to the communications subsystem and configured to, prior to placement of data on the set of storage drives by the set of servers: determine, or receive an indication of, the set of storage groups; and allocate the storage drives of the set of storage drives to the servers in the set of servers in accordance with membership of the each storage drive of the set of storage drives in the set of storage groups, said RAID server including:

a server interface configured to communicably couple the RAID server to the communications subsystem; and at least one computing subsystem, coupled and configured to determine a RAID set of storage drives of the set of storage drives in accordance with storage group membership of each storage drive of the set of storage drives in the RAID set.

34. The RAID server of claim 33, wherein the computing subsystem of the RAID server is configured to cause data from a first server of the set of servers to be stored in redundant fashion in the RAID set of storage drives, wherein the RAID set of storage drives includes a storage drive from at least two storage groups of the set of storage groups, wherein one storage group of the at least two storage groups includes storage drives of the set of storage drives having a common failure risk, and the other storage group of the at least two storage groups does not include any of the storage drives having that common failure risk.

35. The RAID server of claim 34, where n is a replication factor for each data item to be stored, and wherein the RAID set of storage drives are determined so that no more than 1/n of the storage drives of the RAID set of storage drives belong to a single storage group of the set of storage groups.

36. A method for storing data in a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers including the administrator server, each server of the set of servers communicably coupled to the communications subsystem and communicably coupleable to the set of storage drives via the communications subsystem, said method including steps of:

determining, or receiving, an indication of the set of storage groups;

allocating the storage drives of the set of storage drives to the servers in the set of servers in accordance with membership of the each storage drive of the set of storage drives in the set of storage groups;

to a first server of the set of servers, allocating a subset of first storage drives of the set of storage drives that are associated with a corresponding subset of first storage groups of the set of storage groups; and storing data, by the first server on one or more storage drives of the subset of first storage drives, but not on any other storage drives of the set of storage drives.

37. The method of claim 36, wherein the subset of first storage groups consists of storage drives having a single common failure risk of the set of common failure risk(s).

38. The method of claim 37, further comprising storing at least one data item in the subset of first storage groups and in a subset of second storage groups of the set of storage groups via a second server of the set of servers, wherein one of the subset of first storage groups and the subset of second storage groups includes storage drives having a common failure risk and the other of the subset of first storage groups and the subset of second storage groups does not include any of those storage drives having the same common failure risk.

39. A method for storing data in a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers including the administrator server, each server of the set of servers communicably coupled to the communications subsystem and communicably coupleable to the set of storage drives via the communications subsystem, wherein a first server of the set of servers has allocated thereto a subset of first storage drives of the set of storage drives that are associated with a corresponding subset of first storage groups of the set of storage groups, such that the first server can access the subset of first storage drives but not any other storage drives of the set of storage drives, said method including:
- determining, or receiving, an indication of the set of storage groups; and
- allocating the storage drives of the set of storage drives to the servers in the set of servers in accordance with membership of the each storage drive of the set of storage drives in the set of storage groups; and
- performing a RAID function including determining a RAID set of storage drives of the set of storage drives in accordance with storage group membership of each storage drive of the set of storage drives in the RAID set of storage drives, and storing data in redundant fashion on the RAID set of storage drives.

40. The method of claim 39, wherein a plurality of storage drives of the subset of the first storage drives all share a common failure risk.

41. The method of claim 39, wherein the RAID set includes a storage drive from at least two storage groups of the set of storage groups, wherein one storage group of the at least two storage groups includes storage drives of the set of storage drives having a common failure risk, and the other storage group of the at least two storage groups does not include any of the storage drives having that common failure risk.

42. The method of claim 39, wherein said one of the servers of the set of servers is a RAID server, wherein the RAID server performs the RAID function in response to a storage request asserted over the communications subsystem from another one of the servers.

43. A method for configuring a system including a communications subsystem and a set of racks, each rack of the set of racks representing a common failure risk for components installed in that rack, the system further including a set of components installed on the set of racks, the set of components including a set of storage drives communicably coupled to the communications subsystem, wherein all storage drives of at least one rack are organized into a storage group of a set of storage groups based on the common failure risk(s) of that at least one rack, wherein the set of common failure risk(s) associated with each storage group of the set of storage groups is different than that of each other storage group of the set or storage groups, the set of components further including a set of servers, each server of the set of servers communicably coupled to the communications subsystem and communicably coupleable to the set of storage drives via the communications subsystem, said method including in accordance with an administration application running on one of the servers:
- determining, or receiving, an indication of the set of storage groups; and
- allocating the storage drives of the set of storage drives to the servers in the set of servers in accordance with membership of the each storage drive of the set of storage drives in the set of storage groups, such that a first server of the set of servers has allocated thereto a subset of first storage drives of the set of storage drives that are associated with a corresponding subset of first storage groups of the set of storage groups, and such that the first server can access the subset of first storage drives but not any other storage drives of the set of storage drives.

44. The method of claim 43, wherein a plurality of storage drives of the subset of the first storage drives all share a common failure risk.

45. The method of claim 44, further comprising:
- in accordance with the administration application running on said one of the servers, determining a data placement policy of an application running on each server of the set of servers, wherein the data placement policy includes storing a data item in a subset of first storage groups of the set of storage groups via a first server of the set of servers and in a subset of second storage groups of the set of storage groups via a second server of the set of servers; and
- configuring said each of the servers of the set to comply with the data placement policy when running the application, to ensure that data stored by said each of the servers of the set is stored in redundant fashion in at least two of the storage groups, wherein one of the subset of first storage groups and the subset of second storage groups includes storage drives having a common failure risk and the other of the subset of first storage groups and the subset of second storage groups does not include any of the those storage drives having the same common failure risk.

46. The method of claim 43, further comprising:
- configuring at least one of the servers to implement a RAID function, including by determining a RAID set of storage drives of the set of storage drives in accordance with storage group membership of each storage drive of the set of storage drives in the RAID set.

47. The method of claim 43, also including:
- in accordance with the administration application running on said one of the servers, determining the storage groups into which the set of storage drives are organized.

* * * * *